Patented Nov. 4, 1947

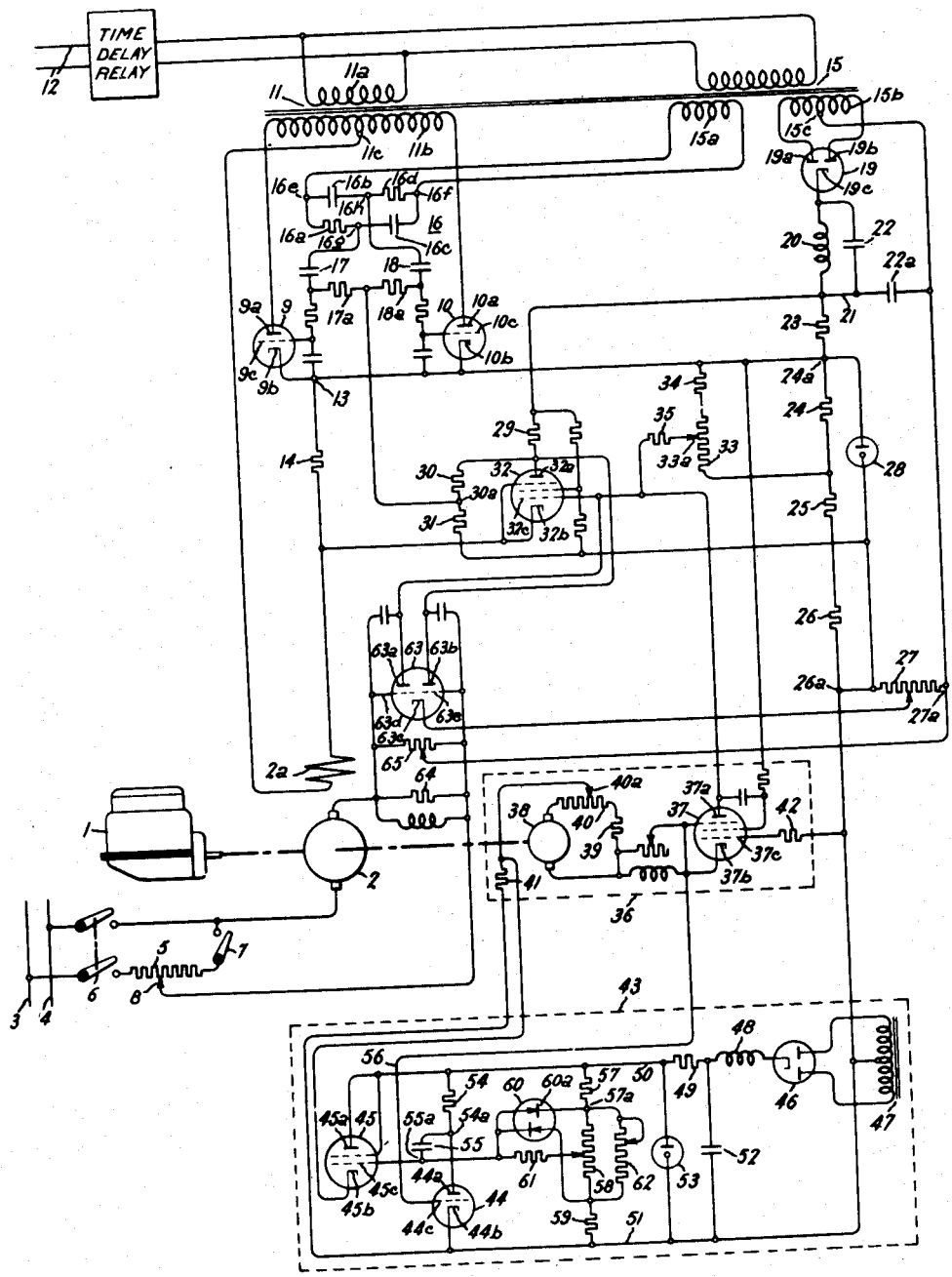

2,430,310

UNITED STATES PATENT OFFICE 2,430,310

ELECTRONIC CONTROL SYSTEM FOR DYNAMOELECTRIC MACHINES

Jerry L. Stratton, Schenectady, N. Y., assignor to General Electric Company, a corporation of New York Application July 9, 1945, Serial No. 603,843

5 Claims. (Cl. 171—312)

This invention relates to control systems for dynamoelectric machines, more particularly to control systems for electric dynamometers such as are employed for testing internal combustion engines, and an object of the invention is the provision of a simple, reliable and improved control system of this character.

In one aspect, the invention relates to a speed and torque regulating system for electric dynamometers. These dynamometers are used mainly for measuring the horsepower output of the internal combustion engine which is being tested. This is accomplished by maintaining the dynamometer speed constant by means of a speed regulator and reading the torque on the dynamometer scales. The horsepower is proportional to the product of speed and torque.

During perfectly normal steady engine conditions of a single cylinder engine there are frequent inherent variations in the horsepower which are not averaged out as in the case of a multicylinder engine. Variations in engine horsepower tend to produce variations in speed to change which the speed regulator responds to change the dynamometer field current. These field current variations in turn change the dynamometer torque in such a direction as to correct the speed. Thus, the dynamometer torque indication on the scale fluctuates during engine conditions which are regarded as steady and normal. This fluctuating torque indication is highly undesirable.

Accordingly a further object of this invention is the provision of means for eliminating undesired torque variations resulting from speed regulator action.

In carrying the invention into effect in one form thereof, means are provided for supplying exciting current to the field winding of the dynamometer. A signal voltage corresponding to an operating characteristic of the dynamometer such as its speed, torque or armature current is continuously compared with a standard or reference voltage. A speed regulator varies the excitation current of the dynamometer in such a direction as to maintain the difference of these two voltages at a minimum. Auxiliary means responsive to changes in the difference of these voltages and thus to changes in the regulated characteristic are provided for decreasing the speed of response of the regulator to an inconsequential low value. An additional means responsive to changes in the regulated characteristic which are greater than a predetermined value are provided for rendering the auxiliary means ineffective. Thus, for changes in the regulated characteristic which are less than a predetermined value, the speed of response of the regulator is reduced to a very low value so that it is prevented from making any material variation in the excitation of the dynamometer. On the other hand, for changes in the regulated characteristic which are greater than this predetermined value, the normal highly sensitive regulator action is provided.

For a better and more complete understanding of the invention, reference should now be had to the following specification and to the accompanying drawing, the single figure of which is a simple, diagrammatical illustration of an embodiment of the invention.

Referring now to the drawing, an internal combustion engine 1 such as a single cylinder gas engine is mechanically connected to a dynamometer 2 of which the armature is alternatively connected to a D.-C. power source which is represented by the supply conductors 3 and 4, or to a power absorbing resistor 5. The armature of the dynamometer may be connected to the D.-C. source 3, 4 by means of a switch 6 so that with the dynamometer acting as a generator, the mechanical energy which is developed by the engine 1 is converted into electrical energy and pumped back into the supply line 3, 4. On the other hand, electrical energy may be supplied to the armature from the supply lines when the dynamometer is operating as a motor to drive the engine. Usually the dynamometer is used as a motor to start the engine. By maintaining the switch 6 in the open position with the dynamometer operating as a generator, and by closing the switch 7, the electrical energy generated by the dynamometer is supplied to the absorption resistor 5 by means of which it is converted into heat. Also, the resistor 5 may be utilized as a starting resistor when the dynamometer is being accelerated as a motor. A manually movable variable contact 8 provides for inserting any desired portion of the resistor 5 in the armature circuit.

The dynamometer 2 is provided with a field winding 2a to which exciting current is supplied from a controlled rectifier comprising a pair of electric valves 9 and 10 and a transformer 11 which is supplied from a suitable source of alternating voltage which is represented by the two supply conductors 12. As shown, the primary winding 11a of the transformer is connected to the supply conductors 12 and the opposite terminals of the secondary winding 11b are connected to the anodes 9a and 10a respectively of the electric valves. The cathodes 9b and 10b for these valves are connected to a common conductor 13 which thus becomes the positive terminal of the rectifier. One terminal of the field winding 2a is connected to the positive terminal 13 and the opposite terminal is connected to the center tap 11c of the secondary winding which thus becomes the negative terminal of the rectifier.

A voltage dropping resistor 14 is included in circuit between the positive terminal 13 of the rectifier and the field winding 2a.

Although the electric valves 9 and 10 may be of any suitable type, they are preferably thyratrons. A suitable gas such, for example, as mercury vapor is introduced into the envelopes of these valves after exhaust. The presence of this gas within the envelope converts the usual electronic regulator into an arc stream, thus constituting the valves electrostatically or grid controlled arc rectifiers. The current which flows in the output circuit of these valves is controlled by controlling the firing point, i. e., the point in each positive half cycle in the anode voltage at which current flow is initiated. For this purpose a control voltage is supplied between the grid and cathode of the valves 9 and 10. This control voltage is made up of two components of which one is an alternating voltage of fixed magnitude and the other is a direct voltage of variable magnitude. The alternating component voltage is derived from a suitable source such as the source 12 by means of a transformer 15 and a resistance capacitance network 16. This network is in the form of a bridge of which two of the arms comprise a resistor 16a and a capacitor 16b and the other two arms comprise a capacitor 16c and a resistor 16d. The input terminals 16e and 16f are connected to the opposite terminals of the secondary winding 15a, and the opposite bridge terminals 16g and 16h are connected through capacitors 17 and 18 to the control grids 9c and 10c of the thyratrons. A pair of resistors 17a and 18a are connected across the terminals of the capacitors 17 and 18 which are connected to the grids of the thyratrons. The alternating component voltage which is supplied from the output terminals of the bridge 16 to the grids of the thyratrons lags the voltage supplied to the anodes by a suitable amount which is preferably 90 degrees.

The variable direct voltage component is derived from source 12 by means of a biphase half wave rectifier 19 and an additional secondary winding 15b of the transformer 15. The valve 19 is illustrated as a double diode having two anodes 19a and 19b and a cathode 19c which is connected through an inductance 20 to a conductor 21 which thus becomes the positive terminal of the rectifier. The rectified voltage is filtered by means of the smoothing reactor 20, the capacitor 22 and a capacitor 22a.

A voltage divider comprising fixed resistors 23, 24, 25 and 26 and a variable resistor 27 are connected between the positive terminal 21 of the rectifier and the center tap 15c of the secondary winding 15b which thus becomes the negative terminal of the rectifier. The voltage across the portion of the voltage divider which comprises the resistors 24, 25 and 26 is impressed across the terminals of the glow discharge valve 28. This glow valve is a gaseous discharge device which operates in that region of its characteristic in which the voltage drop across the valve is substantially constant over a wide range of current. The voltage across the terminals 24a and 26a is fixed in magnitude by the type of glow valve which is used, and within the operating limits of the equipment, this voltage is independent of variations in the alternating voltage of the supply source 12. Any difference in voltage between the voltage across the capacitor 22a which is connected across the positive and negative terminals of the rectifier and the voltage across resistors 24, 25, 26 and 27 is absorbed by the fixed resistor 23.

A second voltage divider comprising resistors 29, 30 and 31 is connected in parallel with the voltage divider 23, 24, 25, 26 and 27. The cathode terminal 24a of the first voltage divider and the intermediate terminal 30a of the second voltage divider is connected to the intermediate terminal of the resistors 17a and 18a. As a result of this connection, a component of direct voltage is supplied between the cathode and grid of the thyratrons.

The current supplied by the thyratrons to the field winding 2a of the dynamometer is varied by varying the magnitude of the direct component which is supplied to the grids of the thyratrons. For this purpose, an electric valve 32 is connected in circuit with the resistor 29 of the second voltage divider across the resistor 23 of the first voltage divider. The circuit is traced from the positive conductor 21 through resistor 29, anode 32a and cathode 32b of valve 32, resistor 14 and conductor 13 to the terminal 24a of the resistor 23.

For the purpose of varying the grid to cathode voltage of valve 32, a potentiometer 33 is provided. This potentiometer is connected in series with a resistor 34 across the section 24 of the first voltage divider and the slider 33a of the potentiometer is connected through a resistor 35 to the control grid 32c of the valve 32. By varying the position of the slider 33a on the potentiometer the grid to cathode voltage of valve 32 is varied with the result that the magnitude of the direct component voltage which is supplied to the grids of the thyratrons is correspondingly varied. When the slider 33a is at the positive end of the potentiometer 33, i. e. at the terminal which is connected to the resistor 34, the conductivity of valve 32 is maximum and the voltage drop across resistor 29 is therefore maximum so that the magnitude of the component voltage which is supplied to the grids of the thyratrons is minimum. On the other hand, when the slider 33a is at the opposite end of the potentiometer 33, the direct component voltage which is supplied to the grids of the thyratrons is maximum. When the direct component is maximum, the thyratrons fire early in the positive half cycle of anode voltage and thus maximum current is supplied to the dynamometer field winding 2a. Likewise, when the direct component voltage is minimum, the firing point is retarded to a late phase position and the current supplied to the field winding 2a is minimum. Thus, with the slider 33a at the positive terminal of the potentiometer, the field current is minimum and with the slider at the negative terminal of the potentiometer, the field current is maximum. For intermediate positions of the slider, the field current has corresponding intermediate values. Thus, the excitation of the dynamometer may be varied manually by adjustment of the slider.

For the purpose of automatically regulating, i. e. maintaining the speed of the dynamometer constant at a desired value, an electronic regulator 36 is provided. This regulator comprises an electric valve 37 which is connected in circuit with the voltage dropping resistor 35 and the upper portion of the potentiometer 33 across the constant voltage buses 24a and 26a. The anode 37a of this valve is connected to the terminal of the resistor 35 which is directly connected to the control grid 32c of valve 32. By varying the conductivity of valve 37, the voltage drop across resistor 35 may be varied thereby to vary the grid voltage of valve 32. As pointed out in the foregoing, this results in varying the current supplied by the thyratrons to the dynamometer field winding.

The conductivity of the regulator valve 37 is controlled in response to the difference between a reference voltage and a signal voltage which corresponds to the regulated operating characteristic, which in the embodiment illustrated is speed. A tachometer generator 38 which is mechanically coupled to the dynamometer shaft produces a voltage which is proportional to speed. This voltage is supplied to a circuit comprising the fixed resistor 39 and the potentiometer 40 connected in series with each other. By adjustment of slider 40a, a portion of the voltage across the fixed resistor and the potentiometer is tapped off for use as the signal voltage. The voltage drop across the resistor 41 serves as a reference voltage with which the signal voltage is compared. The positive terminal of the resistor 41 is connected to the slider 40a which constitutes the positive terminal of the signal voltage. The negative terminal of the resistor 39 is connected to the cathode 37b of the regulator valve and the negative terminal of the resistor 41 is connected through resistor 42 to the control grid 37c of the regulator valve. It will be noted that the grid 37c is connected to the negative bus 26a of the constant voltage. Thus, the difference of the signal and reference voltages is impressed between the cathode and grid of the valve 37.

The manner in which the regulator functions to maintain the speed of the dynamometer substantially constant is briefly as follows: If the speed of the dynamometer increases above the desired value for which the slider 40a is set, the voltage generated by the tachometer increases correspondingly. As a result, the voltage of the cathode 37b becomes more negative with respect to the voltage of the grid, and the conductivity of valve 37 is increased thereby increasing the voltage drop across resistor 35. The increased voltage drop across resistor 35 decreases the voltage of the grid 37c of the control valve with the result that the firing point of the thyratrons is advanced and the current supplied to the dynamometer field winding 2a is increased. The increased excitation of the dynamometer results in decreasing its speed irrespective of whether the dynamometer is operating as a generator or as a motor.

On the other hand, if the speed of the dynamometer decreases, the voltage of the cathode 37b becomes more positive with respect to the voltage of the grid 37c thereby decreasing the conductivity of the valve and correspondingly decreasing the voltage drop across the resistor 35. This increases the grid voltage of the control valve thereby retarding the firing point of the thyratrons and decreasing the current supplied to the field winding. As a result of the decreased excitation the speed of the dynamometer increases irrespective of whether it is operating as a generator or as a motor.

For the purpose of preventing the speed regulator from varying the torque of the dynamometer in response to a change in the speed of which the magnitude is less than a predetermined value, an auxiliary unit 43 is provided. This unit comprises a two-stage electronic amplifier of which the electric valve 44 constitutes the first stage and the electric valve 45 constitutes the second stage. These valves are supplied with D.-C. power from a suitable rectifying unit which is illustrated as comprising the double diode rectifier valve 46 and the transformer 47 of which the primary winding (not shown) is connected to the A.-C. source 12 and the opposite terminals of the secondary winding are connected to the anodes of the diode valve. The cathode of the valve is connected through a reactor 48 and a resistor 49 to a conductor 50 which thus becomes the positive supply bus for the amplifier valves and the conductor 51 which is connected to the center tap of the secondary winding becomes the negative bus. The ripple is filtered from the rectified voltage by means of the reactor 48 and the capacitor 52. A glow discharge valve 53 which is similar to valve 28 serves to maintain the voltage across the buses 50 and 51 constant.

The first stage valve 44 is connected across the buses 50 and 51 with a voltage drop in resistor 54 connected between the anode 44a and the positive bus 50. Similarly, the second stage valve 45 is connected across the constant voltage buses 50 and 51 with the resistor 41 which furnishes the reference voltage for the regulator valve connected between its cathode 45b and the negative bus 51. Coupling between the output circuit of the first stage valve and the input circuit of the second stage valve is provided by means of a capacitor 55 which is connected between the anode 44a of the first stage valve and the control grid 45c of the second stage valve.

By virtue of its connection to the center tap of the secondary winding of the transformer 47, the cathode 44b of the first stage amplifier valve is connected to the control grid 37c of the regulator valve and the control grid 44c of the first stage amplifier valve is directly connected by means of conductor 56 to the cathode 37b of the regulator valve. Thus, the same voltage, i. e., the difference between the signal voltage and the reference voltage, which is supplied between the cathode and grid of the regulator valve is supplied between the cathode and grid of the first stage amplifier valve.

In order that the regulator may function to correct relatively large speed variations such as are produced in changing from one steady engine condition to another, means are provided for rendering the auxiliary unit inactive in response to speed changes which are greater than the predetermined value. This means comprises a source of voltage and electric valve means for supplying a fixed bias voltage to the grid of the second stage valve 45 in response to a predetermined value of the voltage supplied to the grid of the second stage valve from the output circuit of the first stage valve as a result of speed variations of the dynamometer. A voltage divider comprising resistors 57, 58 and 59 is connected across the constant voltage buses 51. It constitutes the source of bias voltage, and the double diode electric valve 60 constitutes the electric valve means for supplying the bias voltage from the voltage divider to the control grid 45c of the second stage valve. The grid 45c is connected through a voltage dropping resistor 61 to an intermediate point of the intermediate resistor 58 of the voltage divider. A potentiometer 62 which is connected in parallel with the intermediate resistor 58 serves to adjust the magnitude of the bias voltage.

The operation of the auxiliary unit to provide two different rates of response of the regulator to speed changes of relatively small and relatively large magnitude is as follows: The first and second stage amplifier valves 44 and 45 are preferably biased for conduction in mid range of their characteristics. If there is a relatively small increase in the speed of the dynamometer, such as is occasioned by variation in the horsepower of a single cylinder engine, the voltage of the tachometer generator 38 is correspondingly increased with the result that the voltage of the grid 44c of the first stage valve is made more negative with respect to its cathode voltage. This decreases the conductivity of valve 44 which in turn decreases the voltage drop across the resistor 54 thereby causing the voltage of the terminal 54a to rise. This tends to increase the voltage across the capacitor 55. However, since the capacitor cannot charge instantaneously, the voltage of the terminal 55a follows the voltage of the terminal 54a, i. e. it becomes more positive thereby increasing the conductivity of the second stage valve 45. The increased current conducted by the second stage valve produces an increased voltage drop across the reference voltage resistor 41. In other words, the reference voltage is increased thereby nearly completely restoring the difference between the reference and signal voltages to the relationship that existed between these two voltages just prior to the speed change. This tends to restore the grid to cathode voltage of the first stage valve to normal. Although these operations are described as taking place in a series of steps, actually they take place in an extremely brief interval of time, i. e. almost instantaneously. Since the cathode and grid of the regulator valve 37 are respectively connected to the grid and cathode of the first stage valve 44, the regulator valve receives practically no signal from the speed increase, i. e. its grid to cathode voltage is not increased appreciably, and therefore it makes practically no change in the dynamometer field current.

However, if the increase in signal voltage persists, a new charge is built up in the capacitor 55 which allows the grid voltage of the second stage valve 45 to return slowly to normal. As the grid voltage returns to normal, the reference voltage across the resistor 41 also returns to normal. As this action takes place, the cathode to grid voltage of the speed regulator valve 37 is correspondingly increased thereby increasing its conductivity. As pointed out in the foregoing, this increases the dynamometer field current and correspondingly reduces the speed of the dynamometer. The reverse action occurs for a decrease in the speed of the dynamometer.

As long as the magnitude of the speed changes of the dynamometer are less than a predetermined value, the change in the grid voltage of the second stage valve is not limited and the auxiliary unit causes the speed regulator to make changes in the dynamometer field current very slowly. However, if the magnitude of the changes in the dynamometer speed become greater than this predetermined value, the voltage between the terminal 55a of the capacitor 55 and the points on the voltage divider 57, 58, 59, to which the conducting paths of the twin diode valves 60 are connected, becomes greater than the breakdown voltage of the valve 60 thereby causing one or the other of its paths to become conducting. For example, if the speed of the dynamometer increases more than a predetermined amount, the voltage between the terminals 55a and 57a exceeds the breakdown voltage of the diode valve so that the path 60a becomes conducting with the result that the grid voltage of the second stage valve cannot be made more positive than the voltage of the point 57a. Consequently there can be no further change in the reference voltage across the resistor 41. Since the change in the reference voltage is thus limited, the action of the auxiliary unit is terminated and the speed regulator valve changes the dynamometer field current at the normal rate.

The result is that through the use of the auxiliary unit the speed regulator is given two rates of response, i. e. two rates of regulating action; one for small speed variations which is slow enough not to produce appreciable torque variations, and the other for large speed changes which allows normal speed regulator action.

The apparatus described in the foregoing provides both automatic and manual speed control of the dynamometer. Each of these controls acts as a limit for the other. During automatic speed regulating operation, the manual adjustment of the slider 33a on the potentiomter 33 acts as a lower excitation limit and therefore must be set lower than the lowest value of the range of currents required for automatic speed of regulation on the particular test being made. Similarly, the speed adjustment, i. e. the position of the slider 40a on the speed adjusting potentiometer 40, acts as an upper limit in speed when the dynamometer is being controlled manually by adjustment to potentiometer 33 and therefore must be set for higher value than any the operator wishes to produce by manual control.

An excessive increase in armature current is prevented by means of the armature current limiting valve 63. As shown, this valve is a twin triode valve and has two anodes 63a and 63b, a common cathode 63c and two control grids 63d and 63e. The anode 63a is connected to the control grid 32c of the control valve 32, whereas the anode 63b is connected to the anode 32a of the control valve. The cathode is connected to the slider of the potentiometer 27 which together with the resistors 24, 25 and 26 constitutes the first voltage divider. The control grids 63d and 63e are connected to opposite terminals of a voltage dropping resistor 64 which is included in the armature circuit of the dynamometer. A potentiometer 65 is connected across the two grids 63d and 63e. An intermediate point of the potentiometer 65 is connected to the negative terminal 27a of the first voltage divider thereby imparting to the grids 63d and 63e a negative bias. This intermediate connection to the potentiometer 65 may be adjusted by means of a slider to equalize the bias on both grids.

If the dynamometer is operating as a generator, an increase in the armature current above a predetermined maximum value makes the voltage of the grid 63d increasingly negative with respect to the voltage of the cathode. This decreases the current conducted by the left-hand conducting path of the valve thereby to control the valve 32 to increase the voltage drop across the resistor 29 and decrease the current supplied to the dynamometer field winding 2a. As a result, the armature current is correspondingly reduced. On the other hand, if the dynamometer is operating as a motor, an increase in the armature current above a predetermined value makes the voltage of the grid 63d more positive with respect to the cathode voltage thereby to increase the current conducted by the valve and correspondingly to increase the voltage drop across the resistor 29. This increases the current supplied to the dynamometer field winding thereby reducing its armature current.

Although in accordance with the provisions of the Patent Statutes this invention is described as embodied in concrete form and its principle has been described together with the best mode in which it is now contemplated applying that principle, it will be understood that alterations and modifications will readily suggest themselves to persons skilled in the art without departing from the true spirit of this invention as set forth in the annexed claims.

What I claim as new and desire to secure by Letters Patent of the United States is:

1. A control system for a dynamoelectric machine having a field winding comprising in combination regulating means responsive to an operating characteristic of said machine for varying the excitation of said field winding to maintain said characteristic substantially constant, auxiliary means comprising an amplifier having first and second stage electric valves each provided with an input control circuit and an output circuit, means for producing a signal voltage corresponding to said regulated characteristic, connections for supplying said signal voltage to the input circuit of said first stage valve, a capacitor coupling the output circuit of said first stage valve to the input circuit of said second stage valve and connections from the output circuit of said second stage valve to said regulating means to effect a relatively slow rate of response of said regulating means to changes of said characteristic of less than a predetermined value, and means responsive to changes of said characteristic greater than said predetermined value for rendering said auxiliary means ineffective thereby to effect a relatively high rate of response of said regulating means.

2. A control system for a dynamoelectric machine having a field winding comprising in combination an amplifier unit having first and second stage electric valves each provided with an input control circuit and an output circuit, a voltage dropping device connected in the output circuit of said second stage valve providing a source of reference voltage, means for producing a signal voltage corresponding to an operating characteristic of said machine which is to be regulated, regulating means for maintaining said characteristic substantially constant comprising a third electric valve having an input control circuit connected to be responsive to the difference of said reference and signal voltages and an output circuit controlled thereby and connected to vary the excitation of said field winding, connections for supplying the difference of said voltages to the input circuit of said first stage valve and coupling connections including a capacitor between the output circuit of said first stage and the input circuit of said second stage valve to provide for varying said reference voltage in response to changes of said regulated characteristic of less than a predetermined value thereby to control said regulating means to vary said excitation at a relatively slow rate, and means responsive to the difference of said voltages for rendering said second stage valve ineffective to vary said reference voltage thereby to control said regulating means to vary said excitation at a relatively fast rate in response to changes in said characteristic greater than said predetermined value.

3. A control system for a dynamoelectric machine having a field winding comprising in combination an amplifier unit having first and second stage electric valves each provided with an input control circuit and an output circuit, a voltage dropping device connected in the output circuit of said second stage valve providing a source of reference voltage, means for producing a signal voltage corresponding to an operating characteristic of said machine which is to be regulated, regulating means for maintaining said characteristic substantially constant comprising a third electric valve having an input control circuit connected to be responsive to the difference of said reference and signal voltages and an output circuit controlled thereby and connected to vary the excitation of said field winding, connections for supplying the difference of said voltages to the input circuit of said first stage valve and coupling connections including a capacitor between the output circuit of said first stage and the input circuit of said second stage valve to provide for varying said reference voltage in response to changes of said regulated characteristic of less than a predetermined value thereby to control said regulating means to vary said excitation at a relatively slow rate, and means responsive to changes in said regulated characteristic greater than said predetermined value for controlling said regulating means to vary said excitation at a relatively fast rate comprising electric valve means responsive to a predetermined difference of said voltages for supplying a bias voltage to the input circuit of said second stage valve thereby to render said second stage valve ineffective to vary said reference voltage.

4. A speed regulating system for a dynamoelectric machine provided with a field winding comprising in combination an amplifier unit having first and second stage electric valves each provided with an input control circuit and an output circuit, a resistor connected in the output circuit of said second stage valve providing a source of reference voltage, a tachometer generator driven by said machine for producing a signal voltage proportional to the speed of said machine, regulating means comprising a third electric valve responsive to the difference of said voltages for varying the excitation of said field winding to maintain the speed of said machine substantially constant, connections for supplying the difference of said voltages to the input circuit of said first stage valve and coupling connections including a capacitor between the output circuit of said first stage valve and the input circuit of said second stage valve to control put circuit of said second stage valve to vary said reference voltage to cause said regulating means to vary said excitation at a relatively slow rate, and electric valve means responsive to a predetermined value of input circuit voltage of said second stage valve for supplying a fixed bias voltage to said second stage input circuit to render said second stage valve ineffective to vary said reference voltage thereby to control said regulating means to vary said excitation at a relatively faster rate.

5. A speed regulating system for a dynamoelectric machine provided with a field winding comprising in combination an amplifier unit having first and second stage electric valves each provided with an input control circuit and an output circuit, a resistor connected in the output circuit of said second stage valve providing a source of reference voltage, a tachometer generator driven by said machine for producing a signal voltage proportional to the speed of said machine, regulating means comprising a third electric valve responsive to the difference of said voltages for varying the excitation of said field winding to maintain the speed of said machine substantially constant, connections for supplying the difference of said voltages to the input circuit of said first stage valve and coupling connections including a capacitor between the output circuit of said first stage valve and the input circuit of said second stage valve to control said second stage valve to vary said reference voltage to cause said regulating means to vary said excitation at a relatively slow rate, and means responsive to a predetermined value of input circuit voltage of said second stage valve for supplying a fixed bias voltage to said second stage input circuit to render said second stage valve ineffective to vary said reference voltage comprising a source of direct voltage, a voltage divider connected across said direct voltage source, a connection including a resistor from an intermediate voltage point of said divider to the input circuit of said second stage valve, and a pair of reversely connected rectifier valves from said second stage input circuit to points on opposite sides of said intermediate voltage point and of respectively higher and lower voltage.

JERRY L. STRATTON.

REFERENCES CITED

The following references are of record in the file of this patent:

UNITED STATES PATENTS

| Number | Name | Date |
|---|---|---|
| 2,111,423 | Given | Mar. 15, 1938 |